No. 869,535. PATENTED OCT. 29, 1907.
H. WAECHTER.
LIQUID DISPENSING VESSEL.
APPLICATION FILED MAY 6, 1907.
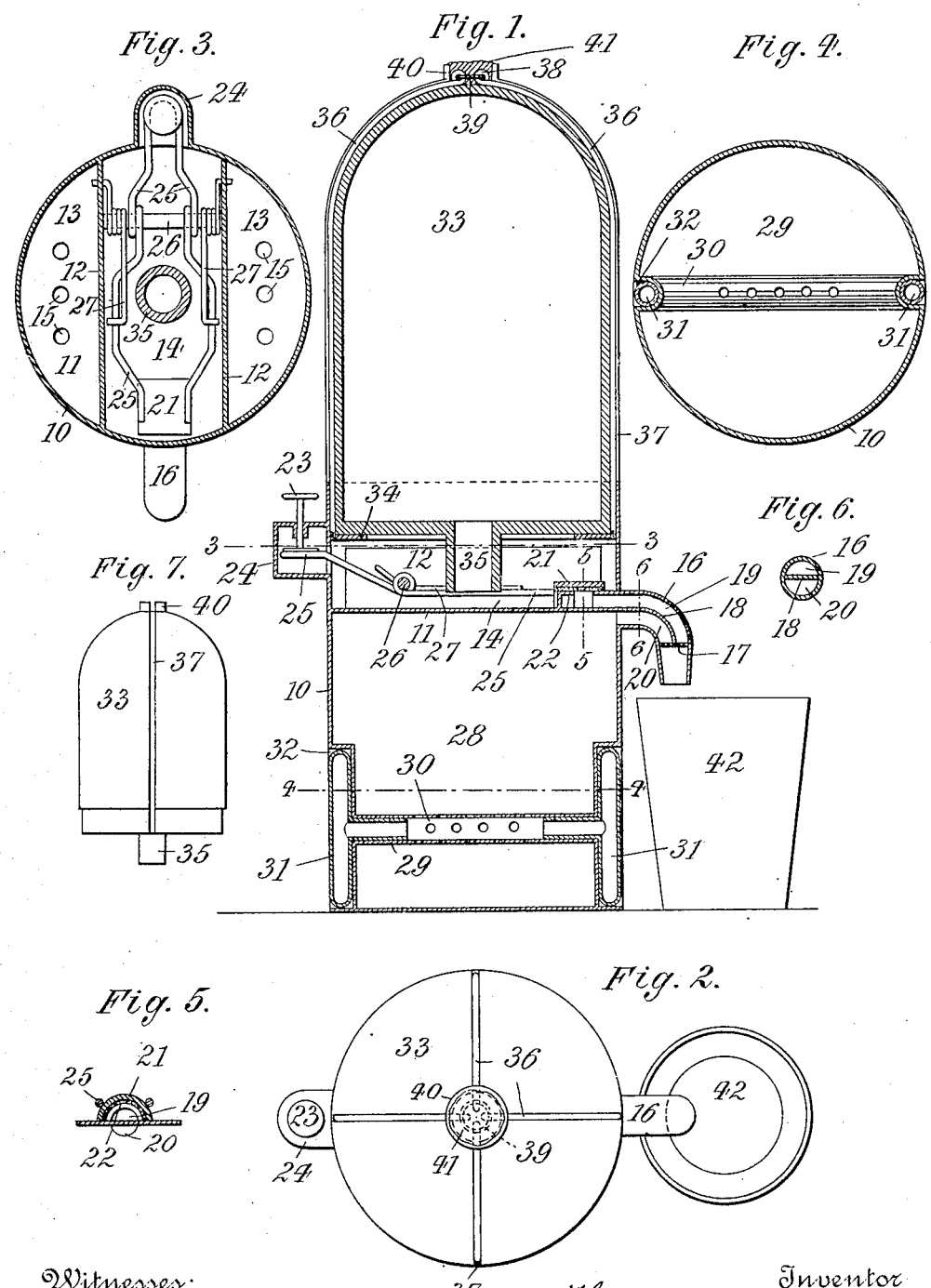

UNITED STATES PATENT OFFICE.

HERMANN WAECHTER, OF NEW YORK, N. Y.

LIQUID-DISPENSING VESSEL.

No. 869,535.  Specification of Letters Patent.  Patented Oct. 29, 1907.

Application filed May 6, 1907. Serial No. 372,201.

*To all whom it may concern:*

Be it known that I, HERMANN WAECHTER, a citizen of the United States, residing at New York city, Queens, county of Queens, State of New York, have invented new and useful Improvements in Liquid-Dispensing Vessels, of which the following is a specification.

This invention relates to a vessel for dispensing liquids, and which is so constructed that any spurious refilling of the vessel may be at once detected.
In the accompanying drawing: Figure 1 is a vertical longitudinal section of my improved liquid dispensing vessel; Fig. 2 a plan; Fig. 3 a horizontal section on line 3—3, Fig. 1; Fig. 4 a similar section on line 4—4, Fig. 1; Fig. 5 a cross section on line 5—5, Fig. 1; Fig. 6 a cross section on line 6—6, Fig. 1, and Fig. 7 a side view, on a reduced scale, of the bottle detached.

A tubular shell 10 is, by horizontal partition 11, divided into an upper compartment and a lower compartment. Across the upper compartment extend a pair of parallel upright walls 12, thus forming a pair of outer chambers 13 and an inner chamber 14, said chambers communicating with each other above the walls. Partition 11 is imperforate beneath chamber 14, but is perforated beneath chambers 13, as at 15. A nozzle 16 is provided with a strainer 17 and a longitudinal partition 18, which forms an upper duct 19 and a lower duct 20. Of these, duct 19 communicates with chamber 14 and is controlled by a valve 21. This valve engages a valve-seat 22 and may be operated by a button 23 which is accessible to the operator. As shown, button 23 is guided in a lateral extension 24 of shell 10 and engages one arm of a double lever 25, to the other arm of which valve 21 is attached. Lever 25 is fulcrumed on a pin 26 supported by walls 12 and is influenced by a pair of coiled springs 27, which tend to normally close valve 21. The lower duct 20 of nozzle 16 communicates with the lower compartment 28 of shell 10, formed beneath partition 11. This compartment has a raised bottom 29 and a diametrically extending perforated tube 30 above such bottom. This tube communicates at each end with a glass gage 31 that projects above as well as below bottom 29, and is seated within a surface groove 32 of shell 10, so as to be exposed to view.

An inverted bottle or other reservoir 33 is supported upon an inner flange 34 of shell 10 and projects a short distance into the latter. Bottle 33 is provided on its bottom with a neck 35 which opens into chamber 14. The bottle is adapted to be locked to shell 10 by wires 36 received by grooves 37 of bottle 33 and tapped at their lower ends into flange 34. The upper ends of wires 36 converge at the top of bottle 33, where they may be sealed. As shown, the wires have upper eyes 38, through which is drawn a binding wire 39 received within a socket 40 formed on top of bottle 33. This socket may be filled by a seal 41, which thus prevents unauthorized removal of the bottle from shell 10.

In use, the liquid contents flow from bottle 33 through neck 35 into chamber 14 to a height corresponding to the distance between partition 11 and the bottom of such neck. To draw the liquid, button 23 is depressed, so that valve 21 is opened and the liquid will flow through the upper duct 19 into glass 42. If the bottle 33 is empty it may be legitimately refilled by breaking seal 41 and removing the bottle from the shell, as will be readily understood.

If an unauthorized re-filling of the vessel is attempted through nozzle 16, part of the liquid will flow through lower duct 20 into compartment 28, from whence it will pass through perforated pipe 30 into gages 31, so as to become promptly exposed to view. That part of the liquid that may pass through the upper duct 19, will flow into compartment 14, from which, upon the righting of the device, part will flow into compartments 13. From the latter the liquid will pass through openings 15 into compartment 28, so as to be again exposed by gages 31. Thus it will be seen that any improper re-charging of the vessel may be at once detected

I claim

1. A device of the character described, comprising a shell having an upper and a lower compartment, a nozzle communicating with both compartments, a gage in the lower compartment, and means for charging the upper compartment, substantially as specified.

2. A device of the character described, comprising a shell having an upper and a lower compartment, a nozzle communicating with both compartments, a gage in the lower compartment, a reservoir adapted to communicate with the upper compartment, and means for securing said reservoir to the shell, substantially as specified.

3. A device of the character described, comprising a shell having an upper and a lower compartment, a nozzle having an upper and a lower duct adapted to communicate with the upper and lower compartment respectively, a valve controlling the upper duct, a gage in the lower compartment, and means for charging the upper compartment, substantially as specified.

4. A device of the character described, comprising a shell having an upper and a lower compartment, means for subdividing the upper compartment into an inner chamber and an outer chamber, said outer chamber communicating with the lower compartment, a nozzle communicating with the inner chamber and the lower compartment, and means for charging said inner chamber, substantially as specified.

Signed by me at New York city, (Manhattan,) N. Y., this 3rd day of May, 1907.

HERMANN WAECHTER.

Witnesses:
GEORGE SEIFERT,
FRANK V. BRIESEN.